United States Patent [19]

Ito et al.

[11] 4,201,084
[45] May 6, 1980

[54] VORTEX FLOW METER

[75] Inventors: Ichizo Ito; Toshio Aga; Tetsuo Ando, all of Musashino, Japan

[73] Assignee: Yokogawa Electric Works, Ltd., Tokyo, Japan

[21] Appl. No.: 959,323

[22] Filed: Nov. 9, 1978

[30] Foreign Application Priority Data

Nov. 14, 1977 [JP] Japan ............... 52-136416
May 24, 1978 [JP] Japan ............... 53-61903

[51] Int. Cl.$^2$ ............................................. G01F 1/32
[52] U.S. Cl. ............................................. 73/194 VS
[58] Field of Search ............ 73/194 VS, 194 B, 194 E

[56] References Cited

U.S. PATENT DOCUMENTS 3,948,098 4/1976 Richardson et al. ............ 73/194 VS
4,164,143 8/1979 Anderson ..................... 73/194 VS Primary Examiner—Jerry W. Myracle
Attorney, Agent, or Firm—Parmelee, Johnson, Bollinger & Bramblett

[57] ABSTRACT

A vortex flow meter produces Karman's vortices in a fluid to be measured and a piezoelectric sensor develops a vortex signal therefrom which is proportional to the flow velocity of the fluid. The output signal of the sensor is applied to a charge amplifier and a low pass filter coupled thereto which functions to a predetermined signal amplitude for limiting low and high frequency noise and stabilizing the gain of the system within the vortex frequency measuring range. The output signal is converted by a logic circuit to a pulse signal of vortex frequency and then converted to a DC signal for transmission to an indicator or a receiver.

10 Claims, 11 Drawing Figures

STRESS

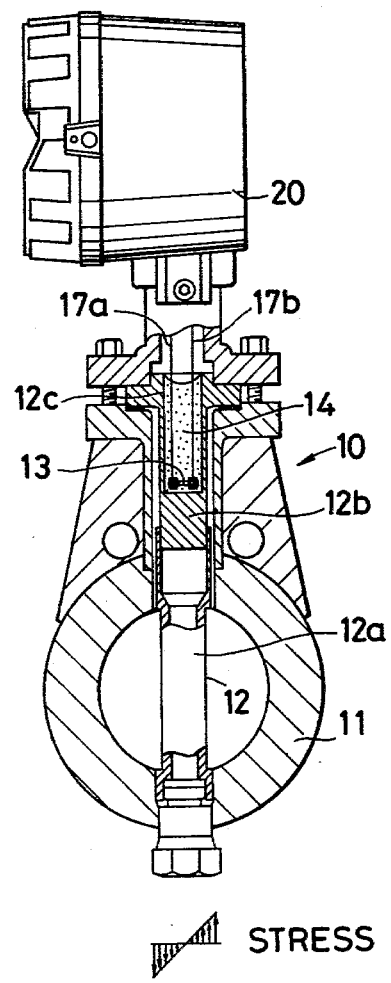
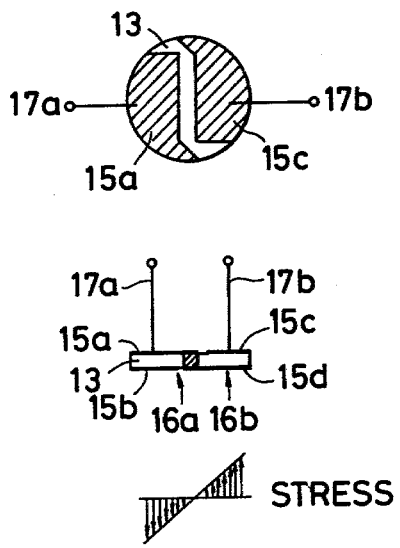
FIG. 1
FIG. 3

IN LOW VELOCITY (0.3 m/h)   ⊤ 1mV ⊥

IN HIGH VELOCITY (3 m/h)   ⊤ 1V ⊥

IN LOW VELOCITY (0.3 m/h)

IN HIGH VELOCITY (3 m/h)

IN LOW VELOCITY $V_z > e_2$

IN HIGH VELOCITY $V_z < e_2$

VORTEX FLOW METER

BACKGROUND OF THE INVENTION

The present invention relates to a vortex flow meter for measuring the flow velocity or quantity of a fluid by utilizing Karman's vortices. More particularly, this invention relates to such a meter equipped with a piezooelectric sensor and a charge amplifier.

It is known that when an object is placed in a fluid, vortices are generated on the sides of the object alternately and regularly to form a flow of vortex street in the downstream. This is referred to as a Karman's vortex street, and the number of vortices (vortex frequency) generated during a unit time is proportional to the flow velocity of the fluid.

The vortex flow meter has a vortex generator disposed in a duct carrying the fluid to be measured, and Karman's vortices proportional to the flow velocity are generated therefrom. These vortices are detected by means of a sensor such as a thermosensitive element or a piezoelectric element to produce an electrical signal corresponding to the flow velocity or quantity of the fluid. One vortex flow meter employing a piezoelectric element to detect the fluid vibration as a change in an AC voltage is disclosed in the U.S. Pat. No. 3,948,098.

The piezoelectric sensor is further capable of detecting the fluid vibration as a change in the electric charge quantity. In this case, the charge quantity obtained from the piezoelectric sensor is converted into a voltage signal by means of a charge amplifier, of which the cutoff frequency normally is selected to be below the minimum value (1 Hz) of the vortex frequency to be measured so that a satisfactory response characteristic is attained within the vortex frequency range (approximately from 1 Hz to 120 Hz when the fluid to be measured is a liquid). For ensuring excellent low-range characteristics in the charge amplifier, it is necessary to select a large value for the time constant of a resistor-capacitor feedback circuit for the amplifier. However, the sensitivity of the amplifier is dependent on the value of the capacitor, which should be reduced to achieve a high sensitivity. Therefore, increasing the resistance is required to attain a large time constant. For example, when setting the cutoff frequency of the charge amplifier to 1 Hz, the resistance required becomes extremely high, e.g. above 1,000 megohms. A problem arises with respect to the reliability in the resistance of any value exceeding 1,000 megohms, in addition to a disadvantage of high production cost. Thus, practical use has not yet been achieved for a vortex flow meter of the type that performs signal processing after detecting the fluid vibration as a change in the electric charge quantity by a piezoelectric sensor.

A noise component referred to as fluctuation of frequencies lower than the vortex frequencies (ranging from 1 to 120 Hz) is superposed on the vortex signal. The noise frequency becomes higher with increasing vortex frequency, and its magnitude also increases with the frequency. Moreover, when detecting the vortex signal by a piezoelectric sensor, detection is affected by noise such as duct vibration caused by a pump or the like. The noise frequencies resulting from duct vibration are within a range from several ten hertz to several hundred hertz, and the magnitude thereof increases generally in proportion to the frequency. In a vortex flow meter, it is desired that any harmful effect of such noise components be effectively eliminated to achieve adequate detection of the vortex signal at a satisfactory signal-to-noise ratio throughout a wide range of flow velocities.

SUMMARY OF THE INVENTION

It is the principal object of the present invention to provide a new vortex flow meter having a piezoelectric sensor and a charge amplifier without the above-described disadvantages.

Another object of the invention is to provide a vortex flow meter wherein an active filter having low-pass characteristics is combined with a charge amplifier for compensating the low-range characteristics of the charge amplifier by the filter as well as effectively eliminating high-frequency noise above the vortex frequency.

Another object of the invention is to provide a vortex flow meter wherein the filter characteristics of an active filter is inactivated when the voltage from a charge amplifier exceeds a predetermined level, so as to effectively eliminate the harmful effect of the fluctuation noise component which is superposed on the vortex signal and has frequencies lower than the vortex frequencies.

A further object of the invention is to provide a two-wire vortex flow meter which is capable of accurately converting a vortex-frequency signal of alternating electric charge into a DC signal of, for example, 4 to 20 milliamperes through a pair of transmission lines to a DC power source and a load located on the receiving side.

In attaining these and other objects and in carrying out this invention in one illustrative embodiment thereof a vortex flow meter is provided having a sensor for detecting a vortex signal which is proportional to the flow velocity of a fluid. The vortex signal is applied to a charge amplifier and a low-pass filter circuit in which the filter operates on the vortex signal until the signal exceeds a predetermined amplitude for eliminating noise components in the vortex signal having frequencies lower that the vortex frequencies to be measured as well as high frequency noise components above the vortex frequency. The vortex frequency signal is then converted to a pulse signal of vortex frequecy and to a DC signal for transmission to a utilization means.

BRIEF DESCRIPTION OF THE DRAWINGS

FIG. 1 illustrates the structure of a vortex flow meter embodying the present invention;

FIG. 3 illustrates the structure of one form of piezoelectric sensor used in the invention;

DESCRIPTION OF THE PREFERRED EMBODIMENTS

Figure 2:
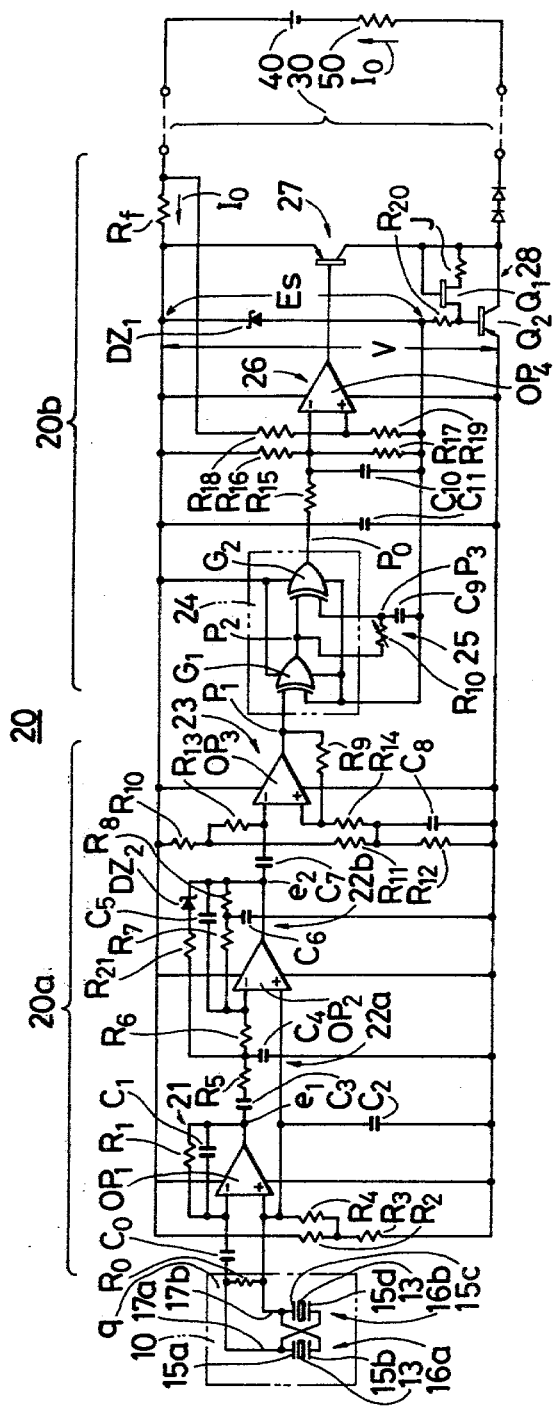
FIG. 2 is an electrical schematic diagram of an embodiment of the invention.

Referring now to FIG. 1, the instrument includes a detector, generally indicated at 10, for detecting the vortices produced in a duct 11 by a pillar-shaped vortex generator 12. This generator is positioned perpendicularly to the duct 11 and is anchored thereto at two ends. The body 12a of the vortex generator 12 is made of a rigid substance such as stainless steel and has a trapezoidal or similar cross sectional shape suitable for generating a Karman's vortex street in the fluid to be measured and also for stably intensifying the fluid vibration. The top 12b of the vortex generator 12 is made of a rigid substance such as stainless steel and has a recess 12c. The top 12b is formed integrally with the body 12a by welding or the like.

A piezoelectric element 13 formed of lithium niobate (LiNbO$_3$) or the like is sealed in the recess 12c of the vortex generator 12 with an insulating material 14 such as glass. The piezoelectric element 13 is shaped like a disk and is so disposed that its center coincides with the neutral axis of the vortex generator 12. As illustrated in FIG. 3, the piezoelectric element 13 is equipped with electrodes 15a, 15b, 15c and 15d located on its obverse and reverse sides symmetrically at the left and right, wherein a portion between the electrodes 15a and 15b forms a first piezoelectric sensor 16a, while a portion between the electrodes 15c and 15d forms a second piezoelectric sensor 16b. The electrodes 15a and 15d are connected to each other, and similarly the electrodes 15b and 15c are connected to each other such that the electric charges generated in the first and second piezoelectric sensors 16a and 16b are coupled differentially by leadwires 17a and 17b which extend from the electrodes 15a and 15c via the insulating material 14 and are connected to the converter 20 both electrically and mechanically.

When the fluid to be measured flows in the duct 11, the vortex generator 12 produces Karman's vortices and receives an alternating force resulting from the fluid vibration resulting from generation of the vortices. Upon application of the alternating force to the vortex generator 12, the stress is changed in mutually opposite directions therein on the two sides of the neutral axis as illustrated. The stress change thus caused in the vortex generator 12 is transmitted to the piezoelectric element 13 through the insulating material 14. Accordingly, in the first and second piezoelectric sensors 16a and 16b, opposite-phase changes of the electric charge quantities are produced corresponding to the stress change.

The noise component including duct vibration causes corresponding vibration of the vortex generator 12 together with the duct 11 since the generator is made of a rigid substance, so that the vibration appears in the form of acceleration in the piezoelectric sensors 16a and 16b, and thus the majority thereof causes in-phase changes of the electric charge quantities. The charge quantities produced in the piezoelectric sensors 16a and 16b are detected differentially, thereby doubling the opposite-phase charge quantities based on the signal. However, the in-phase charge quantities cancel each other to become sufficiently small, so that the signal obtained between the leadwires 17a and 17b has a satisfactory signal-to-noise ratio. The alternating charge q of a vortex frequency f produced between the leadwires 17a and 17b is applied to a converter 20. The quantity of the alternating charge q is proportional to the square of the vortex frequency f.

The alternating force resulting from the fluid vibration of the Karman's vortices is received by the vortex generator 12, and the stress caused therein is detected by the piezoelectric sensors located in the generator 12, so that a remarkably simplified construction is provided without employing any movable component parts, by using a solid and durable detector with high sensitivity. Moreover, since the alternating force resulting from the fluid vibration is received by the entire vortex generator, the detector is affected least by the flow velocity distribution of the fluid being measured. Furthermore, in view of the fact that the sensor is not in direct contact with the fluid, a suitable anticorrosive material may be selected freely for the component parts which are in contact with the fluid, and there is no restriction with respect to the type of coating, thereby permitting use of a detector with a highly corrosive fluid as well. In addition to the above, excellent heat resistance is attainable by employing glass or the like having a high heat-resisting property for the insulating material 14 to seal the piezoelectric element 13 in the vortex generator 12. Thus, a variety of advantageous features are achievable including applicability for use in a high-temperature fluid.

Although the detector 10 of the foregoing embodiment illustrates the two ends of the vortex generator 12 being fixed to the duct 11, the detector 10 may be fixed on one end and free on the other end or fixed on one end and supported on the other end thereof. Fixing means, such as welding, screwing or bolting may be selected as desired. The piezoelectric element 13 of lithium niobate may be replaced with a piezoelectric crystal of lithium niobate or quartz, or a ceramic piezoelectric or pressure-sensing element of zircon titanate (PZT) or tinanate. In short, any element capable of converting a force into a charge quantity is usable. The type of insulating material 14 employed is not limited to glass alone, but may include other material such as epoxy, ceramic, cement or mica. Any suitable material which is an electric insulator with chemical stability capable of transmitting the force produced in the vortex generator 12 to the piezoelectric element with certainty and high sensitivity may be used. A detector having the above structure is disclosed and described in U.S. Pat. application Ser. No. 910,638 filed on May 20, 1978 and is assigned to the assignee of the present invention.

In an embodiment of this invention the piezoelectric element 13 is shown located in the vortex generator 12. However, the structure may be modified to provide a pressure receiver to receive an alternating force resulting from fluid vibration downstream of the vortex generator 12 and separated therefrom. In such modification the piezoelectric element 13 is sealed in the pressure receiver by the insulating material 14, such as glass, so that a stress change occurring in the pressure receiver is detected. Furthermore, the detector 10 is not limited to the type for detecting the stress produced in the vortex generator or in the pressure receiver as a result of fluid vibration, and may have various constructions that detect the fluid vibration by means of a piezoelectric sensor.

The converter 20 of the vortex flow meter comprises a charge amplifier 21 with a filter circuit 22. The amplified signal is applied to a comparator 23 and then to a logic circuit 24 which includes a time constant circuit 25. The resulting signal is coupled to an output amplifier 26 having an output transistor 27 and supplied by a constant voltage circuit 28. The output transistor 27 is connected in series with a feedback resistor $R_f$ to form a series circuit, which is further connected through a pair of transmission lines 30 to a series circuit of a DC power source 40 and a load 50 located on the receiving side, so that the output current $I_o$ controlled by the output transistor 27 flows in the feedback resistor $R_f$ and the load 50. The constant voltage circuit 28 is connected in parallel to the output transistor 27 and consists of a constant current circuit J having a field-effect transistor $Q_1$, and a zener diode $DZ_1$ connected in series thereto through a resistor $R_{20}$. A stabilized voltage Es is generated across the diode $DZ_1$.

Voltage Es is applied to the power terminal of logic circuit 24 and also to one input terminal (−) of an operational amplifier $OP_4$, the output amplifier 26, through voltage-dividing resistors $R_{16}$ and $R_{17}$. Meanwhile, the voltage Es is superposed on a feedback voltage $I_oR_f$ produced across the feedback resistor $R_f$ and then is applied to the other input terminal (+) of the operational amplifier $OP_4$ through voltage-dividing resistors $R_{18}$ and $R_{19}$. Also, the voltage obtained across the series circuit of the resistor $R_{20}$ and the zener diode $DZ_1$ is fed as a line voltage V through a transistor $Q_2$ to operational amplifiers $OP_1$, $OP_2$, $OP_3$ and $OP_4$ in the charge amplifier 21, filter circuit 22, comparator 23 and output amplifier 26.

Charge amplifier 21 includes a capacitor $C_1$ and a resistor $R_1$ connected to the feedback circuit of operational amplifiers $OP_1$ and $OP_2$, and leadwires 17a and 17b of the detector 10 are connected between the input terminals of the charge amplifier 21 through a coupling capacitor $C_o$. The line voltage V is applied between the power terminals of $OP_1$, and also the voltage divided by resistors $R_2$ and $R_3$ is applied to the input terminal (+) of $OP_1$ through a resistor $R_4$. The charge amplifier 21 receives the alternating charge quantity q at the input terminals thereof from the detector 10 and serves to convert the input into an AC voltage $e_1$. Since a variation in the capacities of the leadwires 17a and 17b causes no influence on the output voltage, the charge amplifier 21 prevents deterioriation of the signal-to-noise ratio that could result from a touching of the leadwires 17a and 17b. Consequently, it becomes possible to make the leadwires sufficiently long, thereby facilitating the installation of the converter 20 at a location spaced away from the detector 10. As the piezoelectric element 13 is sealed in the detector 10 with the insulating material 14, such as glass, the insulation resistance of the piezoelectric sensor is normally of a considerably large value. When the detector 10 is used in high temperature application, there occurs a sharp decrease in the insulation resistance of the piezoelectric element 13 of niobate lithium and also in the insulation resistance of the insulating material 14, such as glass, thereby reducing the potential at the input terminal (−) of the operational amplifier $OP_1$ causing saturation of the output $e_1$ of $OP_1$. However, the charge from the detector 10 is received by the charge amplifier 21 through a coupling capacitor $C_o$ prohibiting direct current from flowing toward the detector 10, thereby preventing a vibration of the operating point of the amplifier 21 based on a decrease in the insulation resistance of the detector 10. The capacitance of the coupling capacitor $C_o$ is selectively set to a value sufficiently larger than the equivalent capacitance $C_s$ of the piezoelectric element 13, so as not to affect the gain of the charge amplifier 21 substantially. Therefore, even when using the detector 10 in high temperature applications, the operation of the charge amplifier remains stable without any reduction of its sensitivity. In case static charge is accumulated in the piezoelectric sensor, a discharging resistor $R_o$ may be connected in parallel thereto as required. The capacitor $C_2$ connected between the power terminal and the input terminal (+) of $OP_1$ served to prevent the application of signals from the comparator 23 and so forth to the power supply line.

Figure 4:
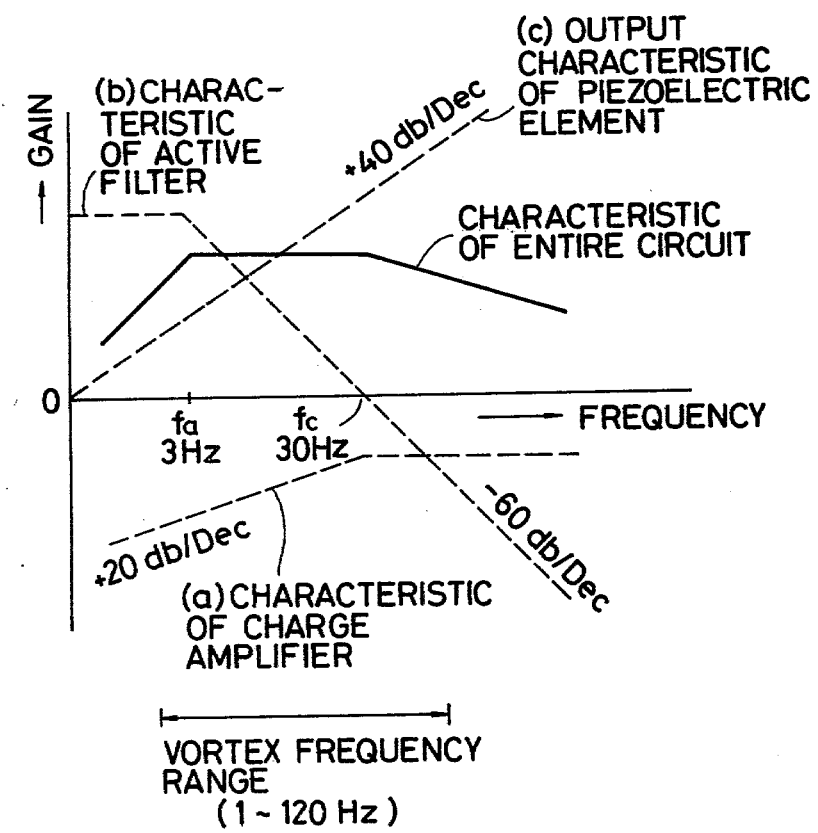
FIG. 4 graphically represents characteristic curves for explaining the operation of the vortex flow meter of the invention.

The filter circuit 22 is illustrated as a single feedback type low-pass filter having an operational amplifier $OP_2$, an input impedance circuit 22a consisting of resistors $R_5$, $R_6$ and a capacitor $C_4$ connected to the input circuit of $OP_2$, and a feedback impedance circuit 22b consisting of resistors $R_7$, $R_8$ and capacitors $C_5$, $C_6$ connected to the feedback circuit of $OP_2$. The output terminal of the charge amplifier 21 is connected to the input terminal of the filter circuit 22 through a coupling capacitor $C_3$. The alternating charge quantity q obtained from the detector 10 increases in proportion to the square of the vortex frequency f. Noise, such as duct vibration, mostly consists of frequencies higher than the vortex frequencies ranging from 1 to 120 Hz. By providing the filter circuit 22, gain of the entire circuit consisting of the piezoelectric element 13, the charge amplifier 21 and the filter circuit 22 is maintained substantially constant within a vortex-frequency measuring range, and the noise left unremoved by the detector 10 (such as extremely great duct vibration or noise resulting from unbalance caused between the first and second piezoelectric sensors 16a and 16b in the manufacturing process) is attenuated completely. Furthermore, AC voltage $e_2$ is produced having a satisfactory signal-to-noise ratio. Also, the low-range characteristics of the charge amplifier 21 can be compensated by using an active filter including the operational amplifier $OP_2$ as illustrated. That is, for attaining excellent low-range characteristics in the charge amplifier 21, it is necessary to establish a large time constant determined by the resistor $R_1$ and the capacitor $C_1$. Since, the sensitivity of the charge amplifier is dependent on the value of capacitor $C_1$, which should be small to achieve a high sensitivity the value of resistor $R_1$ must be large to increase the time constant. For example, when lowering the cutoff frequency of the charge amplifier below the minimum vortex frequency (1 Hz), the required magnitude of resistor $R_1$ is extremely high, e.g. above 1,000 megohms. A problem arises with respect to reliability of a resistor having a value exceeding 1,000 megohms, in addition to the disadvantage of production cost. In the embodiment of this invention, therefore, the cutoff frequency $fc = (1/2\pi C_1 R_1)$ of the charge amplifier 21 is selected to be higher (e.g. 30 Hz) than the minimum vortex frequency, and the value of the capacitor $C_1$ is selected to be greater than the equivalent capacitance $C_s$ of the piezoelectric element 13, so as to set the gain of the charge amplifier to $C_s/C_1 < 1$. The value of the resistor $R_1$ is selected to be sufficiently small (e.g. 50 megohms) at the sacrifice of the low-range characteristics as shown by a dotted line (a) in FIG. 4. The cutoff frequency fa of the active filter 22 is selected to be in the vicinity of the minimum vortex frequency as shown by a dotted line (b) in FIG. 4, with the gain being set to a sufficiently large value. Accordingly, the characteristics of the entire circuit consisting of the piezoelectric element 13, the charge amplifier 21 and the active filter 22 becomes that as illustrated by a solid line in FIG. 4, wherein the low-range characteristics of the charge amplifier 21 are compensated by the active filter 22 to attain a desired gain. Thus, the gain of the entire circuit is rendered constant within a frequency range between fa and fc, and a reduction of, for example, −20 dB/dec is achieved at any frequency above fc. For this reason, the noise of any frequency higher than the measuring frequency range can be fully attenuated with respect to its amplitude, hence attaining an improved signal-to-noise ratio. By combining the active filter 22 with the charge amplifier 21 in this manner, both the low-range characteristics and the sensitivity of the charge amplifier 21 are compensated by the active filter 22, so that the magnitude of the resistor $R_1$ in the charge amplifier 21 can be greatly reduced. When it is desired to further reduce the value of the resistor $R_1$ in the charge amplifier, the output voltage $e_1$ of $OP_1$ may be divided and applied to the resistor $R_1$ to accomplish a reduction proportional to the voltage division ratio.

Figure 5:
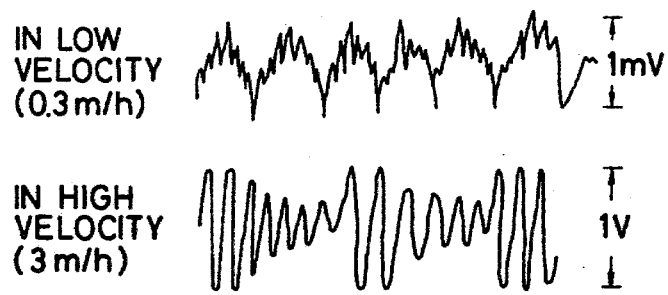
FIGS. 5 through 8 show signal waveforms for explaining the operation of the invention.
Figure 6:
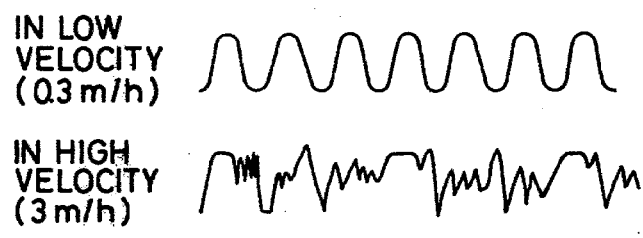

When the fluid to be measured moves at a low velocity, the waveform of the AC voltage $e_1$ produced at the output of the charge amplifier 21 includes a high-frequency noise such as duct vibration superposed thereon as shown in FIG. 5. And when the fluid moves at a high velocity, the waveform includes beat signals with low-frequency fluctuations producing a voltage $e_1$ through the low-pass filter 22 as shown in FIG. 6, indicating that high-frequency noise is removed at the low-velocity flow of the fluid to attain a good signal-to-noise ratio, but that the output in high velocity flow is saturated due to the low-frequency noise producing a waveform in which high-frequency signal components are not distinguishable. This is based on the fact that the signal components have high frequencies in the high velocity flow and are therefore attenuated in the filter circuit 22, while the low-frequency fluctuation components of the noise become large in the high velocity flow.

Figure 7:
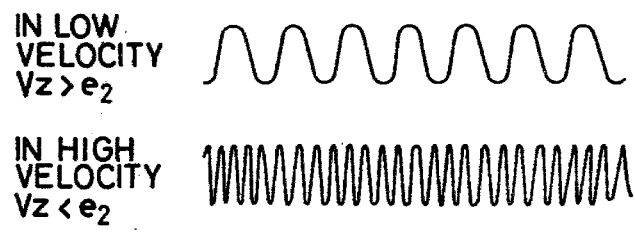

In the present invention, a series circuit comprising a zener diode $DZ_2$ and a resistor $R_{21}$ is connected between the input and output terminals of the operational amplifier $OP_2$ of the filter circuit 22. When the output $e_2$ of $OP_2$ exceeds the zener voltage VZ, feedback is applied to $OP_2$ through the series circuit of $DZ_2$ and $R_{21}$ for inactivating the filter characteristics while providing amplitude-limiting characteristics. Accordingly, by selectively setting the zener voltage VZ to a value equivalent to the output voltage $e_2$ of $OP_2$ in which the vortex frequency is in the vicinity of 6 to 10 Hz, the waveform of the output $e_2$ is produced which is illustrated in FIG. 7. As will be apparent from FIG. 7, the high-frequency noise components of the waveform are eliminated when $e_2$ is below VZ during low velocity flow, while the waveform is not affected by the low-frequency noise components when $e_2$ is above VZ during high velocity flow, so that the signal obtained is at a satisfactory signal-to-noise ratio during both the low and high velocity flow.

Inactivation of the low-pass filter 22 may be achieved by the zener diode $DZ_2$ alone even with omission of the resistor $R_{21}$ in the series circuit. However, this omission causes a slight distortion in the output waveform. Alternate means for inactivating the filter characteristics of the filter circuit 22 may be provided in the form of a switch connected in parallel with circuit 22 which is turned on when the output of the filter circuit 22 or the charge amplifier 21 related to the signal voltage exceeds a preset value. However, the embodiment employing a zener diode is more advantageous because of simplicity.

The comparator 23 is illustrated as a Schmitt trigger having an operational amplifier $OP_3$ and a resistor $R_9$ for providing positive feedback for amplifier $OP_3$. The output terminal of the filter circuit 22 is connected to the input terminal of the comparator 23 through a coupling capacitor $C_7$. The line voltage V is applied between the power terminals of $OP_3$. A voltage obtained through the division of line voltage V by a voltage divider of resistors $R_{10}$, $R_{11}$ and $R_{12}$ is fed to the input terminals (−) and (+) of amplifier $OP_3$ via resistors $R_{13}$ and $R_{14}$, respectively, thereby providing a preset trigger-level for the Schmitt trigger. The values of the resistors $R_{13}$ and $R_{14}$ are selected to be sufficiently greater than those of the resistors $R_{10}$, $R_{11}$ and $R_{12}$, and a capacitor $C_8$ is connected in parallel to the resistor $R_{12}$. The comparator 23 receives the AC voltage $e_2$ through the filter circuit 22 having a vortex frequency f as shown in FIG. 8(a) and serves to convert the voltage $e_2$ into a pulse signal $P_1$ of a fixed level as shown in FIG. 8(b).

Figure 8:
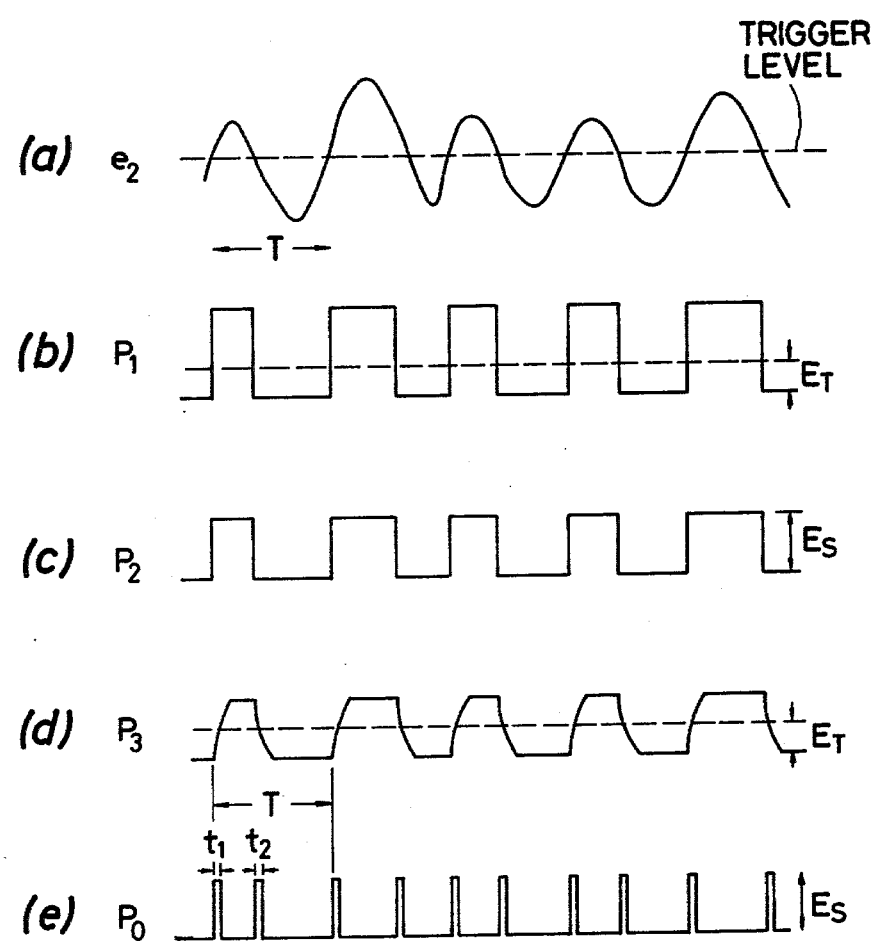

The logic circuit 24 is illustrated as a C-MOS gate circuit having two exclusive OR gates $G_1$ and $G_2$, wherein an output terminal of the comparator 23 is connected to one input terminal of $G_1$, while the other input terminal $G_1$ is connected to the reference side of a fixed voltage Es applied to $G_1$ and $G_2$. The output terminal $G_1$ is connected to one input terminal of $G_2$ and also to a time constant circuit 25, whose output terminal is connected to the other input terminal of $G_2$. The exclusive OR gate produces an output "1" when the states of signals fed to the two input terminals thereof are "1" and "0" or "0" and "1", or produces an output "0" when the input signal states are "1" and "1" or "0" and "0". With a threshold voltage being set to $E_T$ as shown in FIG. 8 for discriminating between "1" and "0", a pulse signal $P_2$ of FIG. 8(c) having a fixed amplitude Es is produced at the output terminal of $G_1$. The signal $P_2$ is fed to the time constant circuit 25 consisting of a resistor $R_{10}$ and a capacitor $C_9$, and is converted into a signal $P_3$ as shown in FIG. 8(d) which rises and falls with a delay according to the time constant $C_9 \cdot R_{10}$ of the circuit 25. This time constant is selected to be sufficiently smaller than the pulse width of the signal $P_1$. As the signal $P_3$ is fed to $G_2$ together with the signal $P_2$, a pulse signal $P_o$ shown in FIG. 8(e) is produced at the output terminal of $G_2$ during a time $t_1$ required for the output of the time constant circuit 25 to reach $E_T$ from zero and also during a time $t_2$ required for the said output to reach $E_T$ from Es. The amplitude Es of the signal $P_o$ is constant, and its pulse width $t=(t_1+t_2)$ in each period T is also constant. The pulse width t is maintained substantially at a fixed value in spite of any variation of the threshold voltage $E_T$ resulting from temperature fluctuation. That is, the characteristic attained is such that the threshold voltage $E_T$ of the C-MOS becomes a half of the line voltage Es near normal temperature. Since the amplitude of the signal fed to the input of $G_2$ is also constant, when $E_T$ drops to decrease $t_1$ in the pulse width $t=(t_1+t_2)$ of the signal $P_o$, $t_2$ increases by an equivalent amount to provide compensation. On the other hand, when $E_T$ rises to increase $t_1$, then $t_2$ decreases by an equivalent amount to provide compensation. The pulse width t is easily adjustable by changing the time constant $C_9 \cdot R_{10}$ by means of the variable resistor $R_{10}$. Consequently, the output pulse signal $P_o$ of the logic circuit 24 has a duty ratio t/T exactly proportional to the vortex frequency f. Signal $P_o$ is fed to the input terminal (−) of the output amplifier 26 through a resistor $R_{15}$. The use of a C-MOS as the logic circuit 24 provides a circuit substantially free from the harmful influences of temperature fluctuations and also minimizes power consumption.

Figure 9:
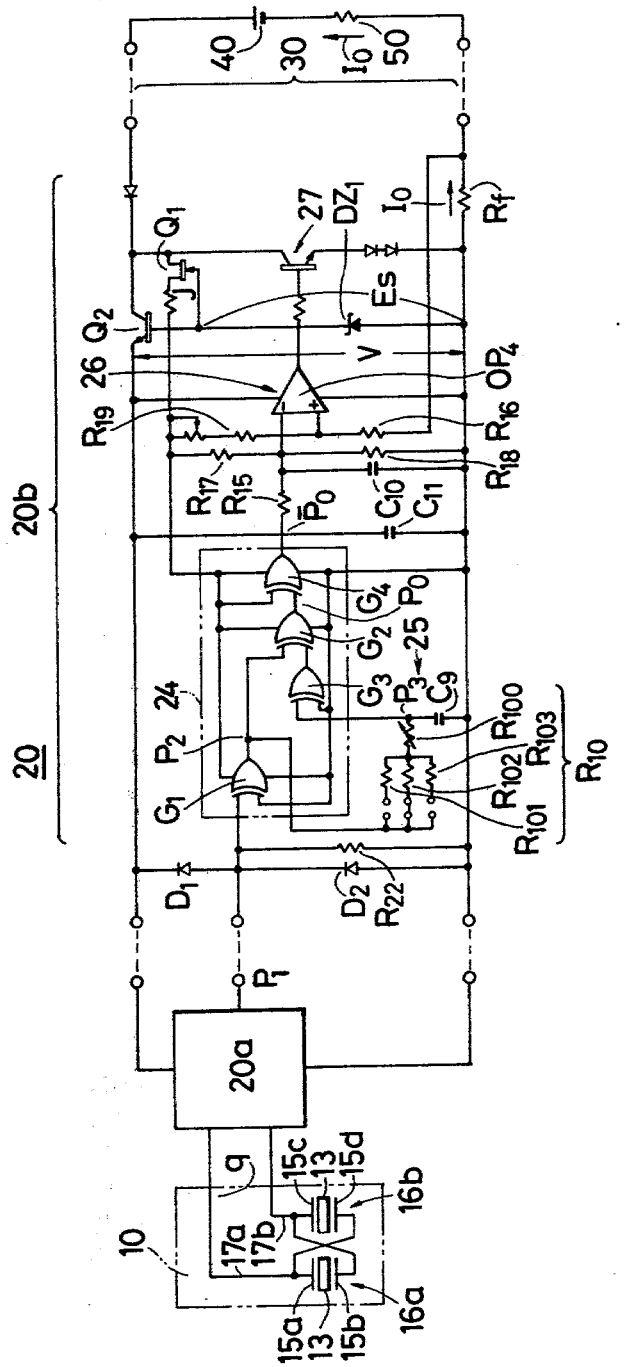
FIGS. 9 through 11 are electrical schematic diagrams of other embodiments of the invention.

As shown in FIG. 9, the output $P_3$ of the time constant circuit 25 may be fed to an exclusive OR gate $G_3$ through $G_2$. In this case, a gate $G_4$ is provided for inverting the output $P_o$ and $G_2$, since a constant voltage circuit 28 is provided on the high-voltage side and a feedback resistor $R_f$ is provided on the low-voltage side in FIG. 9. Although the gates $G_1$ and $G_3$ are illustrated to function as exclusive OR gates, each may function as an OR gate or a NAND gate.

Referring again to FIG. 2, the output amplifier 26 consists of an operational amplifier $OP_4$, whose input terminal (−) is connected to the output terminal of the logic circuit 24 through a resistor $R_{15}$. The line voltage V is applied between the power terminals of $OP_4$, and a voltage obtained through division of the fixed voltage Es by resistors $R_{16}$ and $R_{17}$ is fed to one input terminal (−) of $OP_4$, while the other input terminal thereof receives a voltage obtained through division of the superposed fixed voltage Es and feedback voltage IoRf by resistors $R_{18}$ and $R_{19}$. A capacitor $C_{10}$ for smoothing the pulse signal $P_o$ is connected to the resistor $R_{15}$. Accordingly, the potential Ea at the input terminal (−) of $OP_4$ and the voltage Eb at the input terminal (+) thereof are represented by the following equations.

$$Ea = \frac{R_{17}(R_{15} + t/T R_{16})}{R_{15}R_{16} + R_{16}R_{17} + R_{17}R_{15}} Es \quad (1)$$

$$Eb = \frac{R_{19}}{R_{18} + R_{19}}(IoRf + Es) \quad (2)$$

where $Rf << R_{18}, R_{19}$

The gain of $OP_4$ is sufficiently large, and an output transistor 27 is so driven that Ea and Eb become equal to each other to control the output current Io. Accordingly, the current Io is expressed as $$Io = \frac{R_{18} + R_{19}}{RfR_{19}(R_{15}R_{16} + R_{16}R_{17} + R_{17}R_{15})} R_{16}R_{17} t/T + \frac{R_{15}R_{17}R_{18} - R_{16}R_{19}(R_{15} + R_{17})}{R_{18} + R_{19}} \quad (3)$$

in Equation (3), since each resistance value, the pulse width t and the voltage Es are constant, the output current Io corresponds accurately to the vortex frequency $f=(1/T)$ or the flow velocity of the fluid. The output current Io thus obtained is transmitted through a pair of transmission lines 30 to a load 50 located at a receiver on the receiving side.

The zero point of the output control Io may be made adjustable making resistor $R_{19}$ variable (as shown in FIG. 9), and the span of the meter is adustable by the variable resistor $R_{10}$. It is easy, therefore, to obtain a desired output current Io ranging, for example, from DC 4 to 20 milliamperes against a vortex-frequency change ranging from 0 to 100 percent. And there is a particular advantage that the zero point is not drifted by span adjustment, since such adjustment is executed by changing the pulse width t of the signal $P_o$ by means of the variable resistor $R_{10}$ in the time constant circuit 25.

Figure 10:
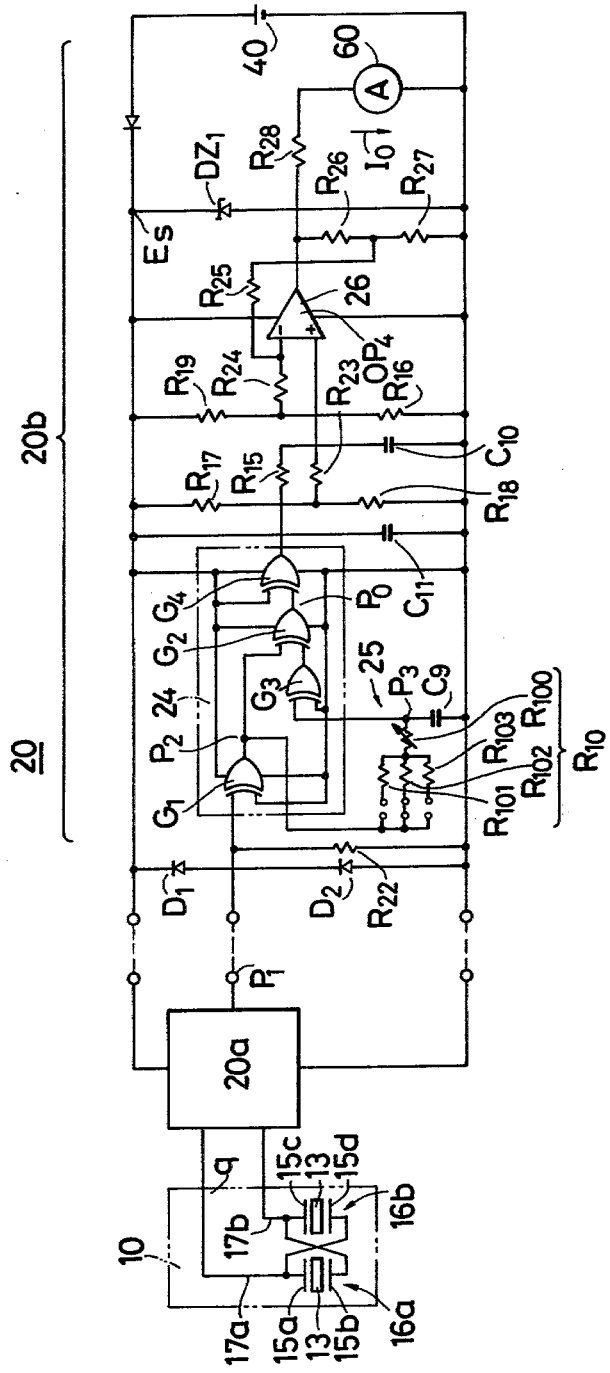
Figure 11:
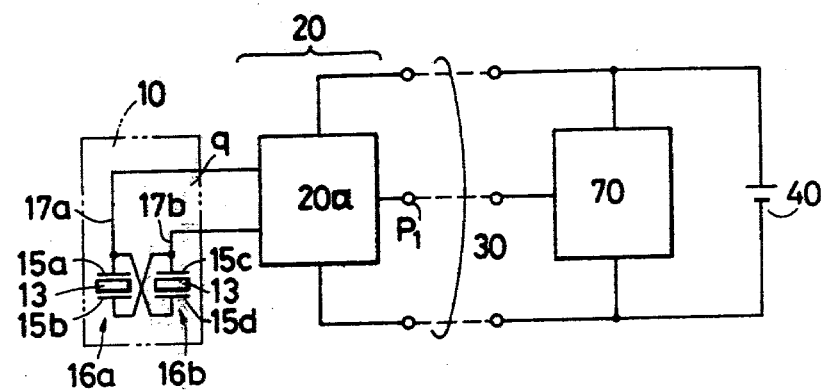

Although the aforesaid embodiment of this invention illustrates the converter 20 being mounted on the detector 10, it is also possible to mount only the front stage 20a of the converter 20 consisting of the charge amplifier 21, the filter circuit 22 and the comparator 23 on the detector 10. When disposing the converter 20 by separating the same into its front stage 20a and rear stage 20b, a malfunction of the logic circuit 24 may occur due to the noise caused by the separation. However, the harmful influence of the noise can be eliminated effectively by providing, as shown in FIG. 9, a protective circuit of diodes $D_1$, $D_2$ and a resistor $R_{22}$ in the input of the rear stage 20b. Moreover, as shown in FIG. 10, a field indication type vortex flow meter can be accomplished by installing a power source 40 in the vicinity of the rear stage 20b and driving an indicator 60 by the output of the amplifier 26 in the rear stage 20b. Furthermore, it is also possible to transmit the pulse signal $P_1$ from the front stage 20a to the receiver or receiving side by omitting the rear stage 20b, as shown in FIG. 11. In this case, the converter 20 and the receiver are connected to each other by three transmission lines 30, and the pulse signal $P_1$ is integrated by means of an integrator 70.

Since other modifications and changes varied to fit particular operating requirements and environments will be apparent to those skilled in the art, this invention is not considered limited to the examples chosen for purposes of disclosure, and covers all changes and modifications which do not constitute departures from the true spirit and scope of this invention.

We claim:

1. In a vortex flow meter having a vortex generator for producing Karman's vortices proportional to the flow velocity in a fluid to be measured and a piezoelectric sensor for detecting a vortex signal based on the Karman's vortices as a change in the quantity of electric charges comprising in combination:
   (a) a charge amplifier coupler to said piezoelectric sensor for converting the alternating charge output of said sensor into an AC signal voltage;
   (b) a filter circuit having a low-pass characteristic coupled to said charge amplifier;
   (c) means coupled to said filter circuit for inactivating the low-pass filter characteristics of said filter circuit when said signal voltage exceeds a predetermined level;
   (d) means coupled to said filter circuit for converting said signal voltage into a pulse signal;
   (e) a time constant circuit having said pulse signal applied thereto;
   (f) a logic circuit having said pulse signal and the other of said time constant circuit applied thereto functioning as an exclusive OR gate for producing an output pulse signal whose duty ratio corresponds to the vortex frequency; and
   (g) an output circuit coupled to said logic circuit for converting the pulse output of said logic circuit into a DC signal representing the flow velocity or quantity of the fluid to be measured.

2. In the vortex flow meter as defined in claim 1, wherein said filter circuit of low-pass characteristic combined with the charge amplifier is an active filter, whose cutoff frequency is selected to be lower than that of the charge amplifier so as to compensate the low-range characteristic of said amplifier.

3. In the vortex flow meter as defined in claim 2, wherein said active filter is a single feedback type low-pass filter comprising an operational amplifier and an impedance element.

4. In the vortex flow meter as defined in claim 1, wherein said filter circuit includes an operational amplifier, a series circuit comprising a Zener diode and a resistor coupled between the input and output terminals of said operational amplifier for inactivating the low-pass filter characteristic of said filter circuit when the output of said operational amplifier exceeds a predetermined level.

5. In the vortex flow meter as defined in claim 1, wherein two piezoelectric sensors are provided integrally with the vortex generator so as to detect a vortex signal based on the Karman's vortices as a change in the quantities of mutually opposite-phase electric charges, said two sensors being positioned on the two sides of the neutral axis of the vortex generator.

6. In the vortex flow meter as defined in claim 1, wherein two piezoelectric sensors are provided integrally with a pressure receiver located in the downstream of the vortex generator, so as to detect a vortex signal based on the Karman's vortices as a change in the quantities of mutually opposite-phase electric charges, said two sensors being positioned on the two sides of the neutral axis of the pressure receiver.

7. In the vortex flow meter as defined in claim 1, wherein said logic circuit is composed of a CMOS.

8. In the vortex flow meter as defined in claim 1, wherein said time constant circuit has a variable resistor for changing to time constant thereof, thereby providing a span adjustment for said vortex flow meter.

9. A vortex flow meter for measuring the flow velocity of a fluid comprising in combination:
(a) a vortex generator for producing Karman's vortices proportional to the flow velocity of a fluid to be measured;
(b) a piezoelectric sensor for producing a vortex signal based on the Karman's vortices as a change in the quantity of electric charges;
(c) a charge amplifier coupled to said piezoelectric sensor for converting the alternating charge output of said sensor into an AC voltage;
(d) a low-pass filter coupled to said charge amplifier;
(e) means coupled to said low-pass filter for inactivating the filter characteristic of said low-pass filter when said signal voltage exceeds a predetermined amplitude level;
(f) means coupled to said low-pass filter for converting said signal voltage into a pulse signal having a vortex frequency;
(g) a time constant circuit;
(h) means for applying said pulse signal to said time constant circuit;
(i) a logic circuit having said pulse signal and the output of said time constant circuit applied thereto functioning as an exclusive OR gate for producing a pulse cycle whose duty ratio corresponds to the vortex frequency;
(j) an output amplifier having a pair of differential input terminals;
(k) a resistor for coupling the output of said logic circuit to one of said differential input terminals of said output amplifier;
(l) a pair of voltage dividers and a feedback voltage;
(m) means for coupling one of said voltage dividers to said one of said differential input terminals;
(n) means for coupling said feedback voltage from the other of said voltage dividers to the other differential input terminal of said output amplifier;
(o) an output transistor driven by said output amplifier;
(p) a pair of transmission lines having a load connected in series to a DC power source on the receiving side thereof, being coupled to said output transistor for controlling the current through said load; and
(q) a feedback transistor for generating said feedback voltage corresponding to the output current flowing in said load, whereby said current flowing in said load on the receiving side of said transmission lines represents the flow velocity or quantity of the fluid to be measured.

10. A three wire vortex flow meter for measuring the flow velocity of a fluid comprising in combination:
(a) a vortex generator for producing Karman's vortices proportional to the flow velocity of a fluid to be measured;
(b) a piezoelectric sensor for detecting a vortex signal based on the Karman's vortices as a change in the quantity of electric charges;
(c) a charge amplifier coupled to said sensor for converting the alternating charge output of said sensor to an AC signal voltage;
(d) a filter circuit having a low-pass characteristic coupled to said charge amplifier;
(e) means coupled to said filter circuit for inactivating said low-pass filter characteristic therefrom when said signal voltage exceeds a predetermined level;
(f) means coupled to said filter circuit for converting said signal voltage into a pulse signal corresponding to the vortex frequency; and
(g) means including three transmission lines for transmitting said pulse signal to a receiver.

* * * * *